H. C. SEIPP.
TIRE.
APPLICATION FILED JUNE 24, 1912.
1,063,221.
Patented June 3, 1913.
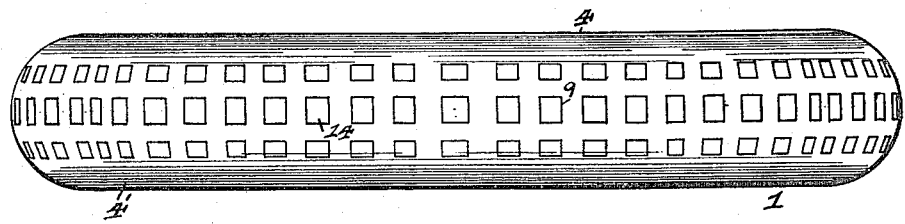
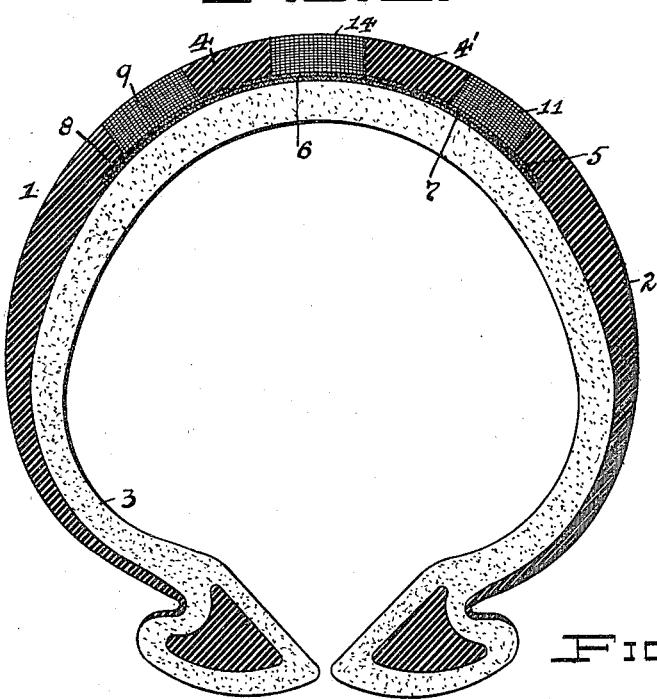
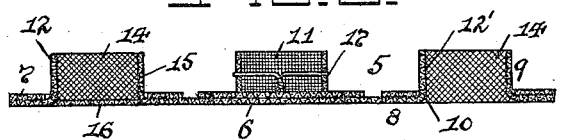
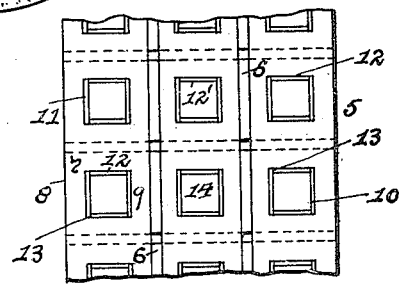
Witnesses:
Inventor:
Henry C. Seipp.
By J. N. Cooke,
Atty.

UNITED STATES PATENT OFFICE.

HENRY C. SEIPP, OF PITTSBURGH, PENNSYLVANIA.

TIRE.

1,063,221.  Specification of Letters Patent.  Patented June 3, 1913.

Application filed June 24, 1912. Serial No. 705,481.

*To all whom it may concern:*

Be it known that I, HENRY C. SEIPP, a resident of Pittsburgh, in the county of Allegheny and State of Pennsylvania, have invented a new and useful Improvement in Tires; and I do hereby declare the following to be a full, clear, and exact description thereof.

My invention relates to tires and has special reference to resilient tires, such as are used on automobiles, auto trucks and other vehicles.

The object of my invention is to form a tire in which the tread of the same can be provided with a cheap, simple and efficient device which by its insertion in such tire will enable the tire to be non-slipping or non-skidding, will reduce the wear on such tire to a minimum and make the same puncture proof.

To these ends my invention consists, generally stated, in the novel arrangement, construction and combination of parts as hereinafter more specifically set forth and described and particularly pointed out in the claims.

To enable others skilled in the art to which my invention appertains to construct and use my improved tire, I will describe the same more fully, referring to the accompanying drawing, in which—

Figure 1 shows a plan view of the tread of a tire embodying my invention. Fig. 2 is an enlarged cross-sectional view of such tire. Fig. 3 is a sectional view of the tread device. Fig. 4 is a plan view of such device.

Like symbols of reference herein indicate like parts in each of the figures of the drawing.

As illustrated in the drawing 1 represents one of the usual approved forms of resilient tires for use with a pneumatic tube within the same, which as generally formed is provided with the outer or exterior surface 2 of resilient material, such as rubber, and the inner or interior surface 3, such as textile material within the same.

Extending around the tread 4 of the tire 1 and within such tire is the tread device 5, which is adapted to be molded or inserted in the tire in any suitable manner and preferably within the outer surface 2 and resting on the inner surface 3. This device 5 is formed of a series of plates, sheets or strips 6 extending across the tread 4 of the tire 1, which are spaced from each other and placed between the surfaces 2 and 3, and resting on and placed exteriorly around said strips 6 are a series of longitudinal plates, sheets or strips 7 (three being shown), which extend around said tire and tread in the form of rings and spaced from each other. These strips 6 and 7 are formed of any suitable flexible material, such as wire fabric, and when placed in position in the tread 4 of the tire 1 form the base 8 of the device 5, while extending out from said base are a series of projections 9, which are formed thereon and the outer faces or ends of the same are adapted to be flush with the periphery 4′ of such tread. These projections 9 are formed by the flanges 11 and 12 which extend outward from the strips 6 and 7 and as shown, are substantially square in shape and are adapted to provide holes, openings or receptacles 10 within the same for the purpose hereinafter described. The holes or receptacles 10 are formed in the projections 9 on the strips 6 and 7 to register with each other by a flange 11 extending outwardly from the outer face of the strips 7 on opposite sides of said holes or receptacles, and a like flange 12 extending outwardly from the outer face of the strips 6 on opposite sides of such holes or receptacles and at right angles to said flanges 11. The flanges 12 are arranged to fit within and against the flanges 11 by their end edges, as at 13, in order to form a wall surrounding the holes or receptacles 10, and such flanges 12 are of greater height than such flanges 11, so that the outer faces or edges of the said flanges 11 and 12 will be flush with each other.

When the plates, sheets or strips 6 and 7 are assembled together they can be secured to each other in any suitable manner, if desired, such as by welding, lacing, riveting or other suitable means, and when so assembled, lead or other suitable frictional material to form a non-slipping or non-skidding surface 14 is placed in the spaces or pockets 15 formed by the wall from the flanges 11 and 12, so that the device is then ready for placing within the tire 1, as hereinbefore described.

If desired the material for forming the treading surface 14 in the projections 9 can be secured therein by a suitable cement placed on the inner faces 12′ of the flanges 11 and 12, and such material can be supported in the pockets 15 by means of the bottom 16, as shown in Fig. 3, so as to prevent from being forced inward against the tire material, while a tying wire or other tying means, such as is shown at 17, can be placed around such flanges to prevent them from spreading when in use on the tire.

Various other modifications and changes in the design, construction, arrangement, combination and application of my improved tire can be resorted to without departing from the spirit of the invention, or sacrificing any of its advantages.

It will thus be seen that my improved tire will be provided with a safety-tread, which can be easily, cheaply and quickly manufactured and assembled, will add little, if any, weight to the tire, as it will be light, yet strong and durable and can be formed of standard or stock material. The treading device will not interfere in any way with the use and operation of the tire and will always give sufficient resiliency to the same at all times, when in use on the tire, while at the same time the tire will be puncture proof and the device will add little if any to the cost in manufacture of the tire, whereas wear on the tire will be reduced and loss of life or injury to persons, property or vehicles on which it is used will be reduced to a minimum. When the tread device is formed of wire fabric or other perforated material, the meshes in the same will allow the material of the tire to permeate or penetrate the fabric and thus amalgamate the whole into a single structure.

What I claim as my invention and desire to secure by Letters-Patent is—

1. A tire of resilient material having a tread device therein comprising a circumferentially disposed strip around the tire, transverse strips engaging with the same, and flanges struck up from each of said circumferential and transverse strips and interfitting to form receptacles for reception of a non-slipping material.

2. A tire of resilient material having a tread device therein comprising a circumferentially disposed flexible strip around the tire, transverse flexible strips engaging with the same, and flanges struck up from each of said circumferential and transverse strips and interfitting to form receptacles for reception of a non slipping material.

3. A tire of resilient material having a tread device therein comprising a circumferentially disposed strip around the tire, transverse strips engaging with the same, flanges struck up from each of said circumferential and transverse strips and interfitting and forming openings in said strips, and fillers secured in the bottom of said openings to form receptacles for the reception of a non-slipping material.

4. A tire of resilient material having a tread device therein comprising a circumferentially disposed flexible strip around the tire, transverse flexible strips engaging with the same, flanges struck up from each of said circumferential and transverse strips and interfitting and forming openings in said strips, and fillers secured in the bottom of said openings to form receptacles for the reception of a non-slipping material.

In testimony whereof, I the said HENRY C. SEIPP, have hereunto set my hand.

HENRY C. SEIPP.

Witnesses:
T. B. HUMPHRIES,
J. N. COOKE.

Copies of this patent may be obtained for five cents each, by addressing the "Commissioner of Patents, Washington, D. C."